Patented Dec. 2, 1941

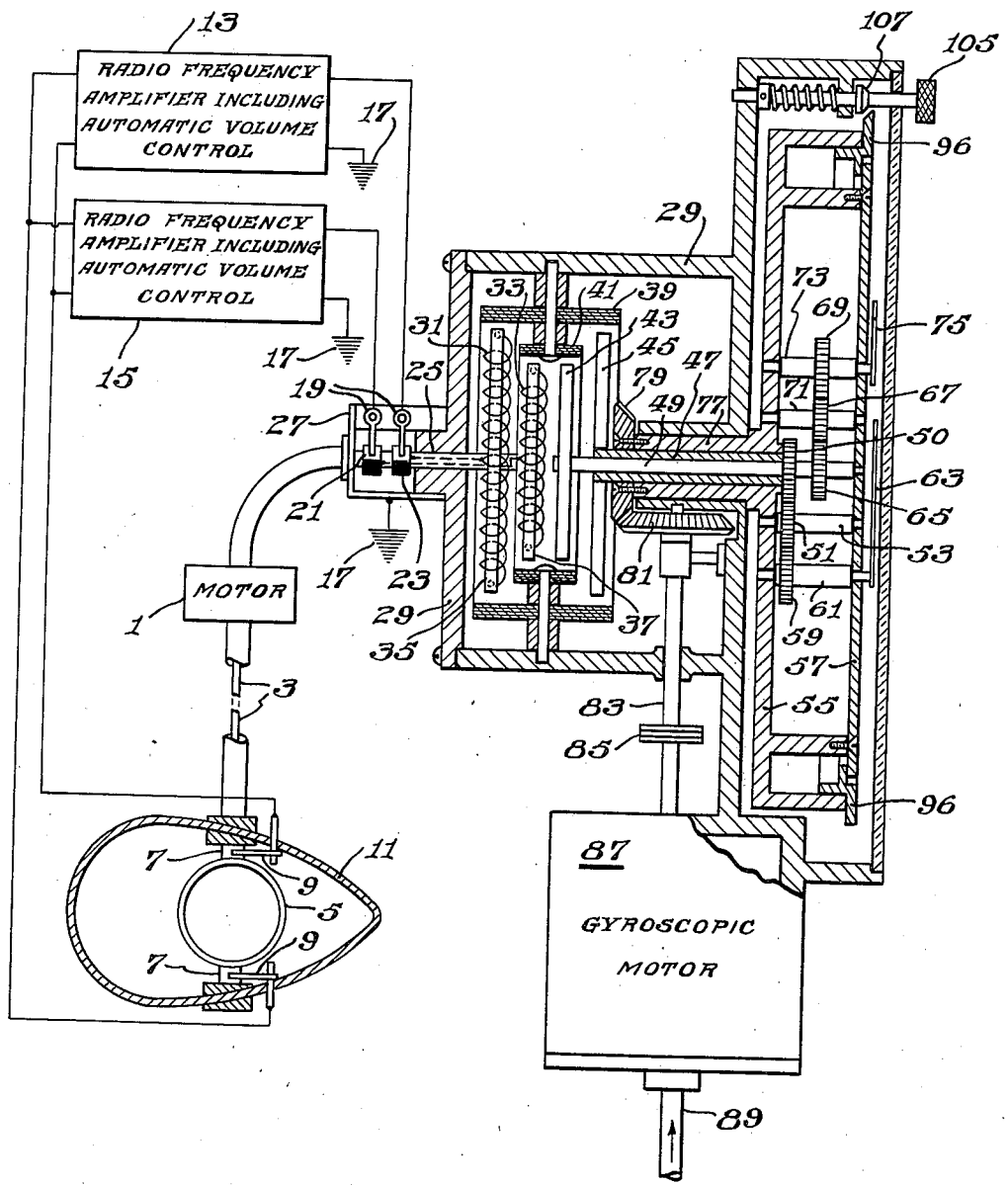

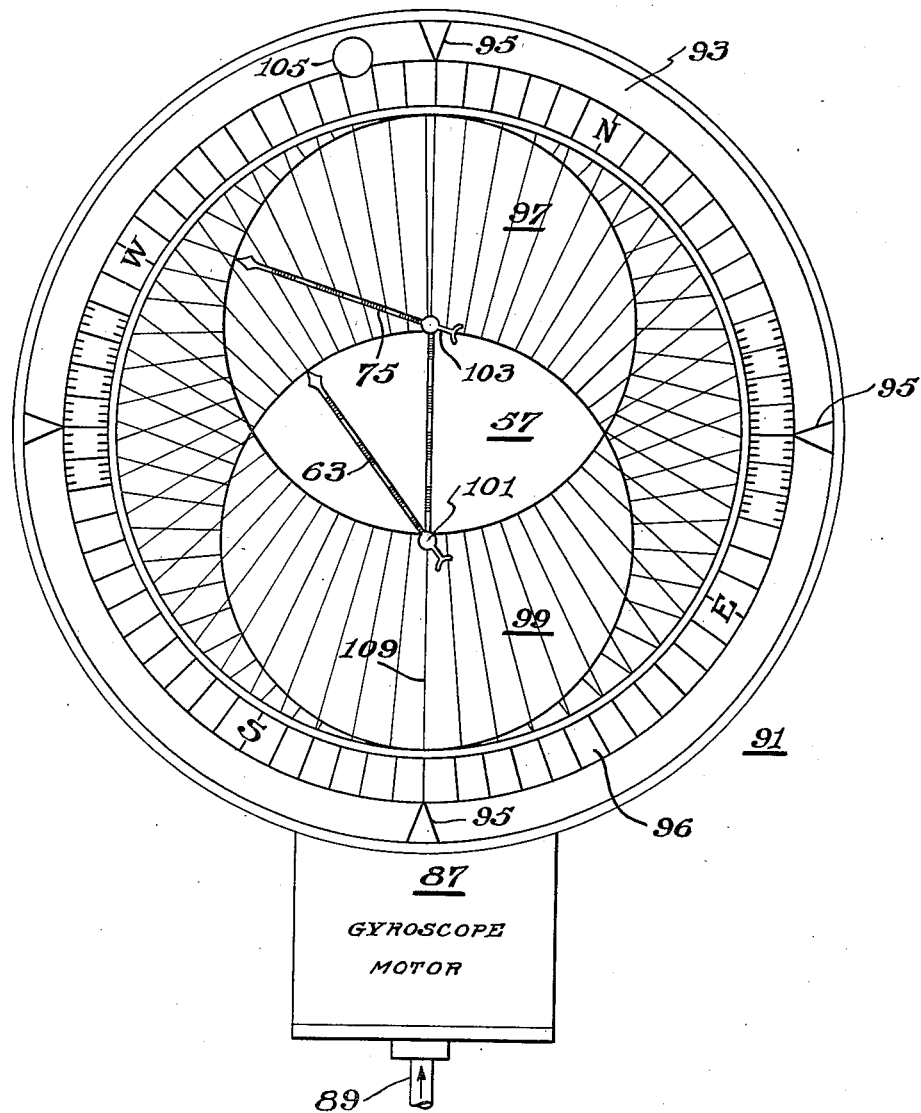

2,264,279

UNITED STATES PATENT OFFICE 2,264,279

RADIO NAVIGATION DEVICE

John B. Dearing, Haddonfield, N. J., assignor to Radio Corporation of America, a corporation of Delaware Original application October 12, 1937, Serial No. 168,537, now Patent No. 2,209,191, dated July 23, 1940. Divided and this application November 18, 1939, Serial No. 305,045

4 Claims. (Cl. 250—11)

This application is a division of copending application Serial No. 168,537, filed October 12, 1937, Patent No. 2,209,191, granted July 23, 1940, for "Radio navigation device."

My invention relates to radio navigation, and particularly to apparatus for indicating continuously the position of a moving aircraft with respect to one or more radio transmitters and the cardinal compass points.

One of the difficulties of aerial navigation, when the visibility is low, is the present practice of employing a plurality of different instruments to convey the required information to the navigator. For example, an aircraft may carry a magnetic compass, a gyrocompass, a radio "left-right" course indicator, or an aural course indicator, an altimeter, and in some cases a radio direction finder. In navigating during low visibility, it is generally necessary for the pilot of an aircraft to coordinate the indications of several of the foregoing instruments and from this information calculate the position of his craft. My invention contemplates an automatic and continuous indication of the position of the aircraft with respect to known points.

One of the objects of my invention is to provide means for automatically indicating the position of an aircraft.

Another object is to provide means for automatically and continuously indicating to the operator of an aircraft the position of his craft with respect to known points.

A further object is to provide means for combining a radio compass bearing indication with a gyrocompass indication.

A still further object is to provide means for continuously indicating the position of an aircraft in motion with respect to a pair of known points and to maintain the indicated orientation of these points with respect to the compass points.

A further object of my invention is to provide means for indicating the position in a vertical plane with respect to ground points of an aircraft in motion to facilitate landing under adverse visibility conditions.

My invention will be described by reference to the accompanying drawings in which—

Figure 1 is a schematic diagram, partly in section, of one embodiment of my invention; and Figure 2 is an elevational view of an indicating dial embodied in my invention.

Referring to Fig. 1, a motor 1 is coupled through a flexible shaft 3 to a rotatable loop antenna 5. The terminals of the loop are connected to slip rings 7. Brushes 9 contact the slip rings. The entire loop may be mounted within a streamlined housing 11. The brushes 9 are connected to the input circuits of a pair of tunable radio frequency amplifiers 13, 15. The amplifiers preferably include automatic volume control circuits from which output currents may be derived. Since the radio frequency amplifiers and automatic volume control are not per se my invention, and since they are well known to those skilled in the art, no detailed description is necessary.

The output currents from the automatic volume control circuits of the amplifiers are conveyed through ground connections 17, and brushes 19 to a pair of commutators 21, 23. The commutators are each arranged to make contact during 180° of revolution, and are insulated during the next 180° for reasons which will be hereinafter set forth. The motor 1 is also connected through a flexible shaft to a shaft 25 which is mounted on suitable bearings in the housing 27, 29. The commutators 21, 23 are mounted on the shaft 25 and are connected by leads which extend through the shaft to armature windings 31, 33. The armature windings 31, 33 are mounted on the rotating armatures 35, 37. The rotating armatures are fastened to the shaft 25 and are rotated in synchronism with the loop 5.

A pair of hollow cylindrical elements 39—41 of magnetizable material are fixedly mounted within the housing 29. These elements are preferably made of laminated iron and arranged so that the flux from the rotating armatures 35, 37 will be conveyed through the elements 39, 41 to a pair of rotatable armatures 45, 43. One of the rotatable armatures 45 is mounted on one end of a hollow shaft 47. The other rotatable armature 43 is mounted on a shaft 49 which has for its bearing the hollow portion of the shaft 47.

A gear 50 is mounted on the end of the hollow shaft 47. The gear 50 engages an idler gear 51 which is mounted on a shaft 53. The shaft 53 has bearings in a movable head 55 and an indicator plate 57. The idler gear 51 is engaged by a gear 59 which is mounted on a shaft 61 which also has bearings in the movable head 55 and indicator plate 57. The shaft 61 extends through the plate 57 and has mounted on its end a pointer 63.

A gear 65 is mounted on the end of the inner shaft 49. This gear 65 engages an idler gear 67. The idler gear 67 engages a gear 69. The last-mentioned gears 67, 69 are respectively carried by shafts 71, 73 which have bearings in the movable head 55 and the indicator plate 57. A pointer 75 is secured to the end of the shaft 73 which projects through the indicator plate. The several gear train ratios are such that the pointers 63, 75 will move the same amount as the rotatable armatures 45, 43 to which they are respectively connected.

The movable head 55 is provided with a hollow shaft 77. The shaft 77 is carried by a bearing in the housing 29. The hollow portion of the movable head shaft 77 becomes the bearing for the shafts 47, 49, which are connected to the rotatable armatures. A bevel gear 79 is suitably mounted on the end of the hollow shaft 77 remote from the head 55. A second bevel gear 81, supported by a shaft 83, engages the bevel gear 79. The shaft 83 is coupled through a friction clutch 85 to a gyroscope motor which is housed within the case 87. The gyro mechanism may be driven by compressed air as indicated by the pipe 89. The gyro motor may be any one of a number of types well known to those skilled in the art and therefore requiring no detailed description. It should be understood that each of the several shafts are provided with suitable thrust bearings to prevent end play.

Reference will be made to both Figs. 1 and 2 for further details of the indicator head and compass card. Similar reference numerals will be applied to indicate similar elements. The dial 91 of the navigating instrument includes an outer rim 93 which is stationary. Convenient reference marks 95 are included in the rim 93. The outer portion 96 of the indicator plate 57 is adjustably mounted with respect to the movable head 55, and the indicator plate proper. This outer portion 96 is divided into degrees and marked N, E, S and W to correspond to a conventional compass card. The indicator plate is marked by two sets of radial lines 97, 99. One of these sets of radial lines 97 is drawn toward the center 101 about which the pointer 63 rotates. The other set of radial lines 99 is drawn toward the center 103 about which the pointer 75 rotates.

The compass card portion 96 of the indicator plate 57 is adjustable both with respect to the centers 101, 103 and with respect to the gyro motor. The former adjustment is effected by an adjusting screw 105. A small disc 107 is secured to the adjusting screw and arranged so that the outer portion of the compass card 96 may be frictionally engaged and rotated when the clutch 85 is prevented from rotating. The latter adjustment is effected by simply moving the upper portion of the clutch 85 with respect to the lower portion whereby the entire indicating plate may be moved with respect to the gyro motor.

The operation of the apparatus is as follows: For a given flight, the navigator selects two radio transmitters of known location. A line through these transmitters will have a known compass bearing. The centers 101, 103 correspond to the transmitters. A line 109 through the centers 101, 103 is oriented with respect to the compass card 96 to thereby correspond to the compass bearing of the line through the transmitters, for example, 30° west of north. In the instant example, it is assumed that the line of flight is parallel to the line 109. With the aircraft headed 30° west of north, the desired line of flight, the gyro motor is adjusted to maintain the compass card as described. If the craft heads to the right or left of the desired course, the gyrocompass card 96 will immediately indicate the departure.

It will be observed that the movement of the indicator plate 57 and compass card 96 will not affect the pointers 63, 75 which are arranged to have independent movements. These movements are controlled as follows: The loop 5 will have a characteristic figure 8 response pattern. The minimum response is obtained when the plane of the loop is parallel to the front of the waves transmitted from the selected radio stations. The radio frequency amplifiers 13, 15 are respectively tuned to the frequency of the waves from the transmitters. At the instant of minimum loop response, the automatic volume control circuits will have maximum response to bring the radio frequency amplifiers to maximum sensitivity. The output currents from the automatic volume control circuits are impressed on the brushes 19.

The brushes 19 engage the commutators 21, 23 during one half revolution to prevent two responses due to the two minimums of the loop. The response points are arranged to give the loop "sense" as well as direction. The same effect may be secured with a cardioid pattern. The currents applied to the commutators are impressed on the windings 31, 33 of the rotating armatures 35, 37 which are moving in synchronism with the loop. The currents through the windings set up magnetic fluxes in the armatures, and from the armatures to and through the magnetizable elements 39, 41. These fluxes are sufficient to move the rotatable armatures 45, 43 into positions which correspond respectively with the positions in which the maximum flux is established in each of the rotating armatures 35, 37. Thus the armatures 43, 45 are maintained in positions which correspond to the bearings of the radio transmitters as determined by the loop 5.

Since the pointers 63 and 75 are respectively coupled to the armatures 45, 43, the pointers will likewise assume positions corresponding to the bearings of the radio transmitters. The intersection of the pointer indications will be the location of the aircraft with respect to the base line, the transmitters and the compass indication. As the aircraft proceeds along its desired line of flight, the pointers will continuously indicate the position of the craft with respect to the radio transmitters. Thus the navigator may follow the flight by observing the single instrument.

One very satisfactory method of navigation with the apparatus I have described is to select broadcasting stations, conveniently located along the line of flight, and operate in accordance with the indications from such stations. It should be understood that, as the craft proceeds beyond the useful range of one or both transmitters, the apparatus is adjusted with respect to other transmitters. If the indicator is to be used to effect a landing during adverse visibility, a pair of ground transmitters are operated on or near the landing field runway. The loop is rotated about a horizontal axis to indicate the position of the aircraft with respect to the base line joining the transmitters. The pointer intersections will indicate the approach of the craft to the runway. In place of a single loop and indicator, a pair of loops and indicators may be used to indicate both horizontal and vertical positions. Of course, a pair of loops arranged with vertical and horizontal rotational means may be used with suitable switches which connect the loops to a single indicator.

In operating over definite airways, for example, New York city to Washington, D. C., a series of stations separated by fifty-mile intervals could be arranged along the line between these cities. A pilot flying to Washington could maintain his course a few miles to one side of the line, and a pilot bound on the opposite course could fly along the other side of the line to avoid collisions. With stations definitely located, at fifty-mile intervals, the space between the pointers could correspond to fifty miles and thereby indicate the mileage between the craft and the base line. It is also contemplated that maps corresponding to each fifty-mile interval could be projected on the indicator plate to make it unnecessary for the navigator to refer his bearing to a map.

It should be understood that I do not limit my invention to a rotating loop but may use well-known equivalents such as a goniometer with fixed loops, and a rotating pick-up coil, or a combination of vertical antenna and loop or goniometer, or dipole antennas with or without reflectors. Likewise, the radio receivers may be tunable radio frequency amplifiers, superheterodyne receivers, and may incorporate detectors, automatic volume control and similar systems. In a similar manner, the gyro motor may be operated electrically by compressed air or any suitable form of energy. I have described the projection of a map on the indicator plate. The map may be a transparent drawing arranged in a roll or other convenient form or may be optically projected on the indicator plate.

Thus I have described a radio navigation device in which a compass indication and a pair of radio bearing indications are combined to continuously indicate the position of a moving aircraft. The radio bearings are indicated by a pair of pointers whose intersection indicates the positions of the craft with respect to a pair of radio transmitters. The compass indication is controlled by a gyroscopic compass.

I claim as my invention:

1. A radio navigation instrument for mobile craft including in combination a pair of pointers for indicating the respective bearings of a pair of radio transmitters, an indicator plate including a base line, said pointers being rotatable about centers positioned at spaced points on said base line, automatic means for maintaining constant the orientation of said plate and base line independent of the heading of the craft carrying the device, said automatic means including a hollow shaft connected to said indicator plate, radio devices responsive as a function of the fronts of waves emitted by said transmitters for deriving output currents corresponding respectively to the bearing of said transmitters, and means for applying said currents to orient said pointers to indicate said bearings, said means including a pair of shafts coaxially arranged within said hollow shaft and coupled through intermediate means to said pointers.

2. A radio navigation apparatus for mobile vehicles including in combination an indicator plate, said plate including a base line, a first hollow shaft connected to said plate at said base line, means coupled to said shaft for maintaining constant the orientation of said indicator plate and base line independent of the heading of the craft carrying said apparatus, a pair of pointers rotatable about points on said base line on either side of said shaft, a pair of rotatable armatures, means including a second hollow shaft arranged within said first hollow shaft, and a shaft arranged within said second hollow shaft for connecting each of said pointers to said armatures, a second pair of rotatable armatures, a pair of radio amplifiers, means for energizing said amplifiers as a function of the fronts of waves radiated by said transmitters, means for applying the output currents of said amplifiers to energize said second pair of armatures, and means for transferring the energy to said first pair of pointers to maintain their orientation respectively with respect to said wave fronts.

3. A radio navigation apparatus for mobile craft including a compass card, an indicator plate coaxially located with respect to said compass card, said indicator plate including a base line drawn through its axis, a pair of pointers rotatably mounted on centers on either side of said axis and on said base line for indicating the bearings of a pair of radio transmitters, said indicator plate including radial lines extending from said compass card toward said centers, a first hollow shaft and a shaft within said hollow shaft coaxially arranged with respect to said axis, gear trains connecting said shafts respectively to said pointers, means responsive to the fronts of waves radiated from a pair of radio transmitters whose bearings are to be indicated for orienting said pointers as functions of said respective wave fronts, and means for orienting automatically and continuously said card and plate so that the orientation of said base line is independent of the heading of the craft carrying said device.

4. An apparatus of the character of claim 2 including a compass card frictionally and adjustably secured to said indicator plate and rotatable therewith, and a plurality of radial bearing lines extending from said compass card toward the respective points about which said pointers rotate.

JOHN B. DEARING.